(12) United States Patent
Jernigan et al.

(10) Patent No.: US 11,537,634 B2
(45) Date of Patent: Dec. 27, 2022

(54) METHODS FOR HIERARCHICAL PROPAGATION IN TREE STRUCTURES AND DEVICES THEREOF

(71) Applicant: NetApp, Inc., Sunnyvale, CA (US)

(72) Inventors: Richard Jernigan, Sewickley, PA (US); Keith Bare, Pittsburgh, PA (US); Bill Zumach, Pittsburgh, PA (US)

(73) Assignee: NETAPP, INC., Sunnyvale, CA (US)

( * ) Notice: Subject to any disclaimer, the term of this patent is extended or adjusted under 35 U.S.C. 154(b) by 39 days.

(21) Appl. No.: 17/217,333

(22) Filed: Mar. 30, 2021

(65) Prior Publication Data
US 2022/0318271 A1    Oct. 6, 2022

(51) Int. Cl.
*G06F 16/28* (2019.01)
*G06F 16/23* (2019.01)
*G06F 16/22* (2019.01)

(52) U.S. Cl.
CPC ........ *G06F 16/282* (2019.01); *G06F 16/2246* (2019.01); *G06F 16/2322* (2019.01); *G06F 16/2358* (2019.01)

(58) Field of Classification Search
CPC ............... G06F 16/282; G06F 16/2246; G06F 16/2322; G06F 16/2358
See application file for complete search history.

(56) References Cited

U.S. PATENT DOCUMENTS

| | | | | |
|---|---|---|---|---|
| 9,830,345 | B1* | 11/2017 | Baars | G06F 16/2246 |
| 2013/0232174 | A1* | 9/2013 | Krajec | G06F 11/3604 |
| | | | | 707/798 |
| 2015/0142818 | A1* | 5/2015 | Florendo | G06F 16/22 |
| | | | | 707/741 |
| 2016/0012110 | A1* | 1/2016 | Hirzel | G06F 16/2246 |
| | | | | 707/797 |
| 2016/0239581 | A1* | 8/2016 | Jaidka | H04L 51/52 |
| 2018/0260769 | A1* | 9/2018 | Ahmed | G06Q 10/087 |
| 2019/0205424 | A1* | 7/2019 | Jubb, IV | G06F 16/13 |
| 2020/0065256 | A1* | 2/2020 | Palmer | G06F 16/2246 |
| 2021/0034039 | A1* | 2/2021 | Lee | H04L 63/0823 |
| 2021/0182313 | A1* | 6/2021 | Shemer | G06F 11/2094 |
| 2022/0035794 | A1* | 2/2022 | Mahadik | G06F 16/2379 |

* cited by examiner

*Primary Examiner* — James Trujillo
*Assistant Examiner* — Michal Bogacki
(74) *Attorney, Agent, or Firm* — Troutman Pepper Hamilton Sanders LLP (Rochester)

(57) ABSTRACT

Methods, non-transitory machine readable media, and computing devices that provide more efficient hierarchical propagation in tree structures are disclosed. With this technology, a first delta record for a first interior node is created optionally in an atomic transaction along with updating a first tally record for a leaf node based on a first value. The transaction is in response to an action associated with the leaf node and the first interior node is a parent of the leaf node in a hierarchical tree. A timer associated with the first delta record is then set. A second value is updated in a second tally record for the first interior node based on the first value, when the timer has expired. Accordingly, this technology advantageously maintains recursive properties or values throughout a hierarchical tree continually, with reduced cost, even in a distributed network and in hierarchical trees with large numbers of nodes.

17 Claims, 7 Drawing Sheets

METHODS FOR HIERARCHICAL PROPAGATION IN TREE STRUCTURES AND DEVICES THEREOF

FIELD

This technology generally relates to data storage and, more particularly, to methods and devices for improved hierarchical propagation in tree data structures.

BACKGROUND

Tree data structures are commonly used by computing devices to maintain data having an associated hierarchical arrangement. In one exemplary deployment, information regarding a file system can be maintained in a branched tree structure, such as a network attached storage (NAS) directory tree with interior nodes corresponding to directories and leaf nodes corresponding to files and maintaining a collection of properties or values (e.g., the storage consumption of the associated file). In a NAS environment, many storage nodes can store portions of a distributed database that each maintain a portion of a distributed tree structure associated with the file system. Analytics software can then utilize the tree maintained in the distributed database to report on the file system.

However, as files and subdirectories change, and content is created, deleted, renamed, and moved around the NAS directory structure, the distributed database must be updated to reflect the adjustments at one or more levels of the NAS directory tree. For example, extending by just one byte a file that is deep in the tree must cause its parent directory to reflect that its children have one more byte of usage. Then, the parent directory in a level above the parent to the extended file must likewise be updated, and so on all the way up to the root of the tree. Accordingly, for effective operation of the analytics software, recursive properties of the tree must be tracked and the distributed database must reflect the recursive properties from any particular point of the tree structure downwards.

Generally, two types of analytics methodologies have been used with tree structures: static analytics and dynamic analytics. Static analytics requires that a user invoke a recursive scanner that exhaustively studies the file system reflected in a NAS directory tree, for example, to produce a report. Analytics software utilizing a static approach can defer the cost of determining the recursive properties, thereby facilitating lower resource consumption whenever the analytics function is not invoked. However, user response time due to propagation delays can be significant.

Dynamic analytics can provide the same insights more quickly because the analytics or other storage system software has been tracking the associated data all along. Dynamic analytics features are more desirable, but tracking continuous changes to a broad file system, in a recursive fashion, is computationally expensive, particularly for distributed NAS directory trees that require communication over a cluster fabric to propagate changes. In other words, attempting to continuously maintain a distributed database reflecting a NAS directory tree in the face of a fast-changing file system in which concurrent changes are occurring continuously in parallel across a distributed storage fabric can require a significant performance burden that negatively impacts other storage functions.

DETAILED DESCRIPTION

Figure 1:
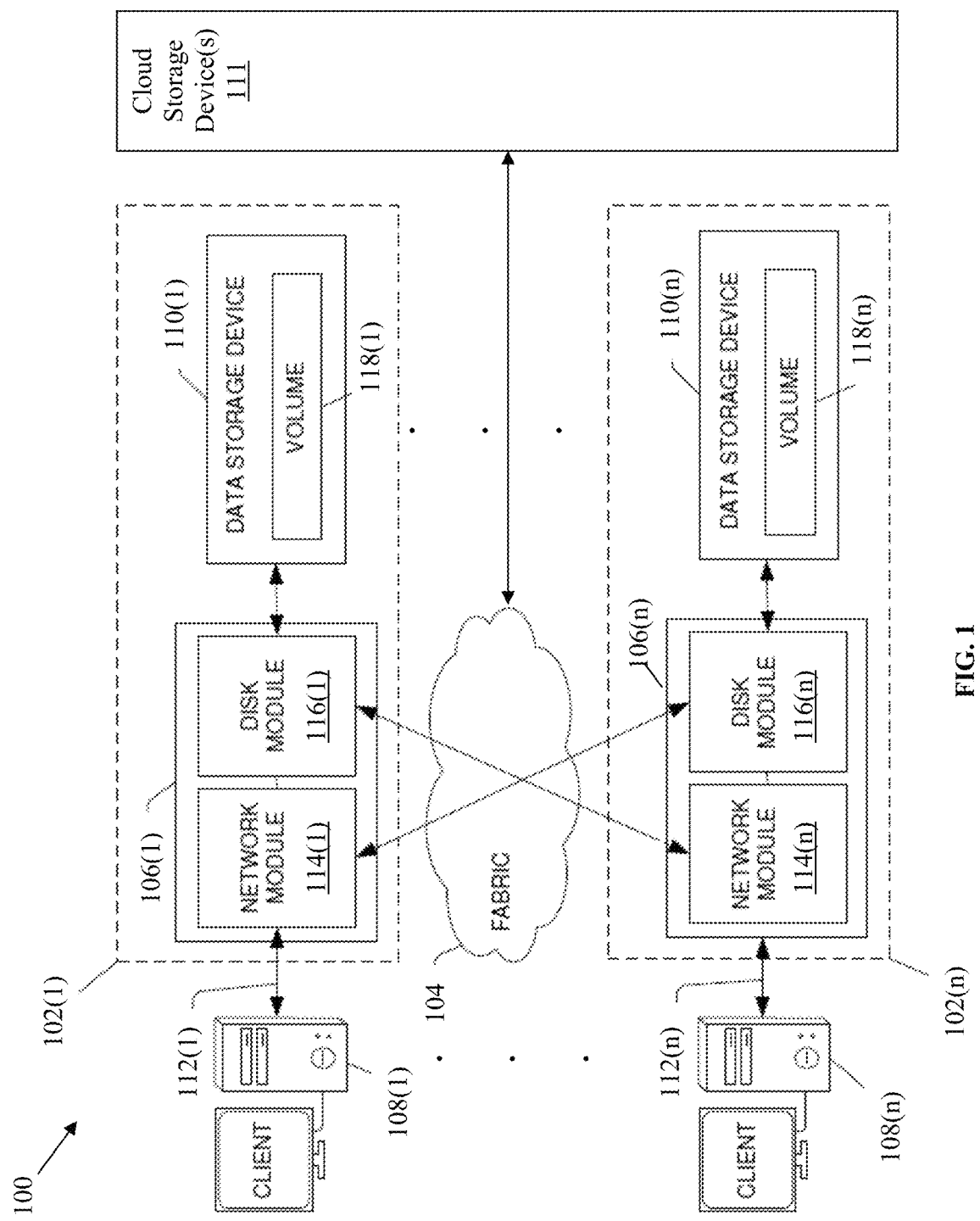
FIG. 1 is a block diagram of a network environment with exemplary data storage apparatuses.

A clustered, distributed network environment 100 that may implement one or more aspects of the technology described and illustrated herein is shown in FIG. 1. The network environment 100 includes data storage apparatuses 102(1)-102(n) that are coupled over a cluster fabric 104 that includes communication network(s) and facilitates communication between the data storage apparatuses 102(1)-102(n) (and one or more modules, components, etc. therein, such as, node computing devices 106(1)-106(n), for example), although any number of other elements or components can also be included in the clustered network environment 100 in other examples.

This technology provides a number of advantages including methods, non-transitory computer readable media, and computing devices that improve hierarchical propagation of recursive properties in a tree structure while reducing cost, resource utilization, and cross-device communications. This technology utilizes delta records that reflect property changes and timers that, when expired, initiate an upward propagation of the property values based on the contents of the delta records. The delta record values may be updated many times before a corresponding timer expires, but this technology advantageously delays the propagation to prevent changing every corresponding parent for every change to a leaf node.

Accordingly, the technology effectively introduces a relatively small latency with respect to reporting updated results from higher levels of a hierarchical tree in order to significantly decrease the amount of propagation work that needs to be performed, thereby decreasing the performance burden of maintaining large hierarchical data structures. While the examples described and illustrated herein relate to data storage network and file system analytics that leverage hierarchical trees, this technology can improve performance for any application in which recursive properties need to be maintained relatively inexpensively within a large hierarchical trees.

Accordingly, in this particular example, the node computing devices 106(1)-106(n) illustrated in FIG. 1 can be primary or local storage controllers or secondary or remote storage controllers that provide client devices 108(1)-108(n) with access to data stored within data storage devices 110(1)-110(n) and cloud storage device(s) 111. The data storage apparatuses 102(1)-102(n) and/or node computing devices 106(1)-106(n) of the examples described and illustrated herein are not limited to any particular geographic areas and can be clustered locally and/or remotely via a cloud network, or not clustered in other examples. Thus, in one example the data storage apparatuses 102(1)-102(n)

and/or node computing device 106(1)-106(n) are distributed over a plurality of storage systems located in a plurality of geographic locations; while in another example a clustered network can include data storage apparatuses 102(1)-102(n) and/or node computing device 106(1)-106(n) residing in a same geographic location (e.g., in a single on-site rack).

In the illustrated example, one or more of the client devices 108(1)-108(n), which may be, for example, personal computers (PCs), computing devices used for storage (e.g., storage servers), or other computers or peripheral devices, are coupled to the respective data storage apparatuses 102(1)-102(n) by network connections 112(1)-112(n). Network connections 112(1)-112(n) may include a local area network (LAN) or wide area network (WAN) (i.e., a cloud network), for example, that utilize TCP/IP and/or one or more Network Attached Storage (NAS) protocols, such as a Common Internet File system (CIFS) protocol or a Network File system (NFS) protocol to exchange data packets, a Storage Area Network (SAN) protocol, such as Small Computer System Interface (SCSI) or Fiber Channel Protocol (FCP), an object protocol, such as simple storage service (S3), and/or non-volatile memory express (NVMe), for example.

Illustratively, the client devices 108(1)-108(n) may run applications and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage controller configured to process I/O commands issued by the client devices 108(1)-108(n)), and the data storage apparatuses 102(1)-102(n) may return results of the requests to the client devices 108(1)-108(n) via the network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations and/or cloud storage (e.g., a storage endpoint stored within cloud storage device(s) 111), etc., for example. Such node computing devices 106(1)-106(n) can be attached to the cluster fabric 104 at a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing devices 106(1) and 106(n) may be configured according to a disaster recovery configuration whereby a surviving node provides switchover access to the storage devices 110(1)-110(n) in the event a disaster occurs at a disaster storage site (e.g., the node computing device 106(1) provides client device 108(n) with switchover data access to storage devices 110(n) in the event a disaster occurs at the second storage site hosting node computing device 106(n)). In other examples, the node computing device 106(n) can be configured according to an archival configuration and/or the node computing devices 106(1)-106(n) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the network environment 100, node computing devices 106(1)-106(n) can include various functional components that coordinate to provide a distributed storage architecture. For example, the node computing devices 106(1)-106(n) can include network modules 114(1)-114(n) and disk modules 116(1)-116(n). Network modules 114(1)-114(n) can be configured to allow the node computing devices 106(1)-106(n) (e.g., network storage controllers) to connect with client devices 108(1)-108(n) over the storage network connections 112(1)-112(n), for example, allowing the client devices 108(1)-108(n) to access data stored in the network environment 100.

Further, the network modules 114(1)-114(n) can provide connections with one or more other components through the cluster fabric 104. For example, the network module 114(1) of node computing device 106(1) can access the data storage device 110(n) by sending a request via the cluster fabric 104 through the disk module 116(n) of node computing device 106(n). The cluster fabric 104 can include one or more local and/or wide area computing networks (i.e., cloud networks) embodied as Infiniband, Fibre Channel (FC), or Ethernet networks, for example, although other types of networks supporting other protocols can also be used.

Disk modules 116(1)-116(n) can be configured to connect data storage devices 110(1)-110(n), such as disks or arrays of disks, solid state drives (SSDs), flash memory, or another form of data storage, to the node computing devices 106(1)-106(n). Often, disk modules 116(1)-116(n) communicate with the data storage devices 110(1)-110(n) according to the SAN protocol, such as SCSI or FCP, for example, although other protocols can also be used. Thus, as seen from an operating system on node computing devices 106(1)-106(n), the data storage devices 110(1)-110(n) can appear as locally attached. In this manner, different node computing devices 106(1)-106(n), etc. may access data blocks, files, or objects through the operating system, rather than expressly requesting abstract files.

While the clustered network environment 100 illustrates an equal number of network modules 114(1)-114(n) and disk modules 116(1)-116(n), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(n) can be networked with the node computing devices 106(1)-106(n) in the cluster, over the storage connections 112(1)-112(n). As an example, respective client devices 108(1)-108(n) that are networked to a cluster may request services (e.g., exchanging of information in the form of data packets) of node computing devices 106(1)-106(n) in the cluster, and the node computing devices 106(1)-106(n) can return results of the requested services to the client devices 108(1)-108(n). In one example, the client devices 108(1)-108(n) can exchange information with the network modules 114(1)-114(n) residing in the node computing devices 106(1)-106(n) (e.g., network hosts) in the data storage apparatuses 102(1)-102(n).

In one example, the storage apparatuses 102(1)-102(n) host aggregates corresponding to physical local and remote data storage devices, such as local flash or disk storage in the data storage devices 110(1)-110(n), for example. One or more of the data storage devices 110(1)-110(n) can include mass storage devices, such as disks of a disk array. The disks may comprise any type of mass storage devices, including but not limited to magnetic disk drives, flash memory, and any other similar media adapted to store information, including, for example, data and/or parity information.

The aggregates include volumes 118(1)-118(n) in this example, although any number of volumes can be included in the aggregates. The volumes 118(1)-118(n) are virtual data stores or storage objects that define an arrangement of storage and one or more file systems within the clustered network environment 100. Volumes 118(1)-118(n) can span a portion of a disk or other storage device, a collection of disks, or portions of disks, for example, and typically define an overall logical arrangement of data storage. In one example volumes 118(1)-118(n) can include stored user data as one or more files, blocks, or objects that reside in a hierarchical directory structure within the volumes 118(1)-118(n).

Volumes 118(1)-118(n) are typically configured in formats that may be associated with particular storage systems, and respective volume formats typically comprise features that provide functionality to the volumes 118(1)-118(n), such as providing the ability for volumes 118(1)-118(n) to form clusters, among other functionality. Optionally, one or more of the volumes 118(1)-118(n) can be in composite aggregates and can extend between one or more of the data storage devices 110(1)-110(n) and one or more of the cloud storage device(s) 136 to provide tiered storage, for example, and other arrangements can also be used in other examples.

In one example, to facilitate access to data stored on the disks or other structures of the data storage devices 110(1)-110(n), a file system may be implemented that logically organizes the information as a hierarchical (e.g., tree) structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 110(1)-110(n) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, files, and/or other storage objects, for example. Among other things, these features, but more particularly the LUNs, allow the disparate memory locations within which data is stored to be identified, for example, and grouped as a data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
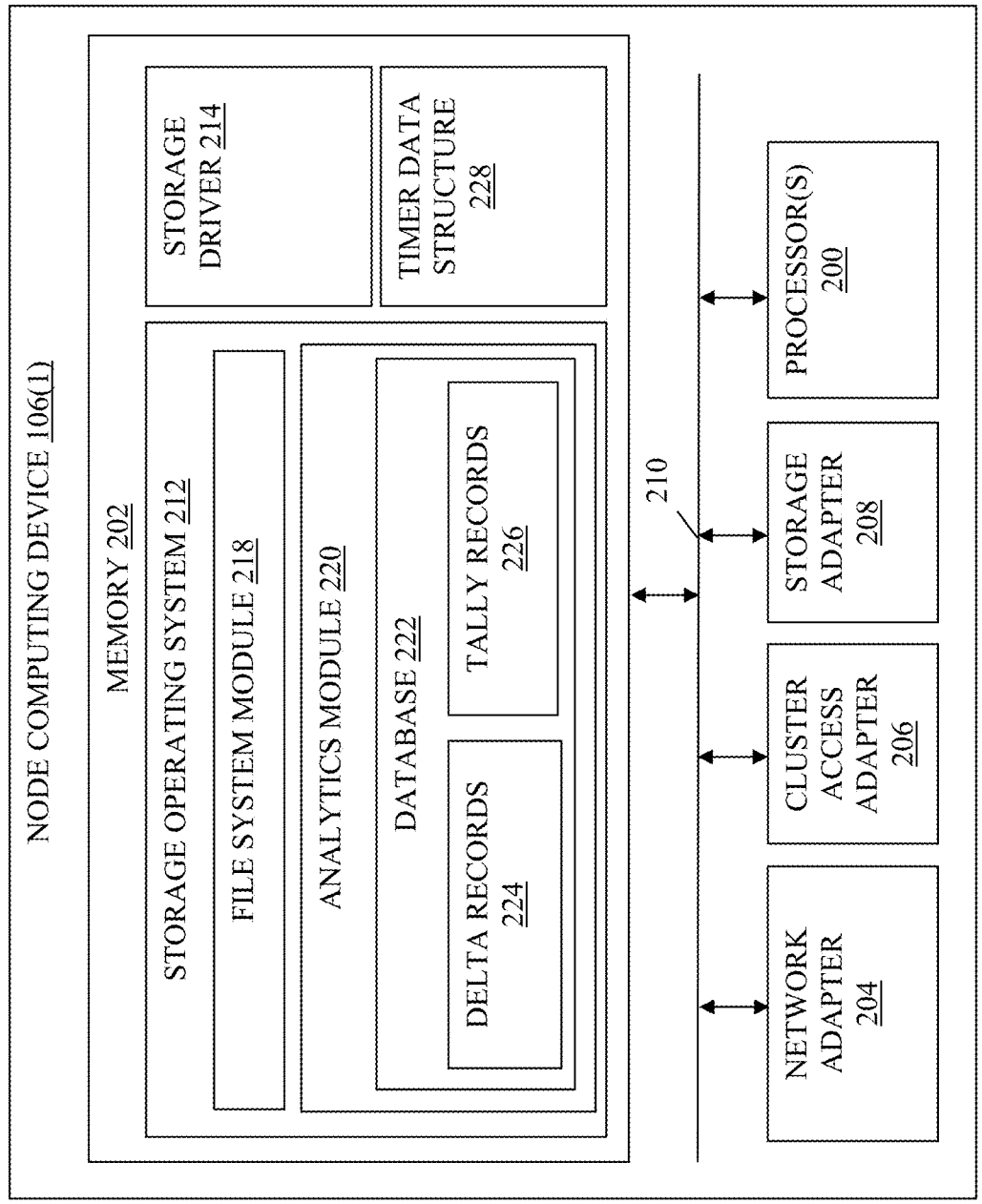
FIG. 2 is a block diagram of an exemplary node computing device of one of the data storage apparatuses of FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106(1) also includes a storage operating system 212 installed in the memory 202 that can, for example, implement a RAID data loss protection and recovery scheme to optimize reconstruction of data of a failed disk or drive in an array. In some examples, the node computing device 106(n) is substantially the same in structure and/or operation as node computing device 106(1), although the node computing device 106(n) can also include a different structure and/or operation in one or more aspects than the node computing device 106(1).

The network adapter 204 in this example includes the mechanical, electrical and signaling circuitry needed to connect the node computing device 106(1) to one or more of the client devices 108(1)-108(n) over network connections 112(1)-112(n), which may comprise, among other things, a point-to-point connection or a shared medium, such as a LAN. In some examples, the network adapter 204 further communicates (e.g., using TCP/IP) via the cluster fabric 104 and/or another network (e.g. a WAN) (not shown) with cloud storage device(s) 111 to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include I/O interface circuitry that couples to the disks over an I/O interconnect arrangement, such as a SAN protocol. The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(n) and/or sent to another node computing device attached via the cluster fabric 104. In some examples, a storage driver 214 in the memory 202 interfaces with the storage adapter 208 to facilitate interactions with the data storage devices 110(1)-110(n).

The storage operating system 212 can also manage communications for the node computing device 106(1) among other devices that may be in a clustered network, such as attached to the cluster fabric 104. Thus, the node computing device 106(1) can respond to client device requests to manage data on one of the data storage devices 110(1)-110(n) or cloud storage device(s) 111 (e.g., or additional clustered devices) in accordance with the client device requests.

The file system module 218 of the storage operating system 212 can establish and manage one or more file systems including software code and data structures that implement a persistent hierarchical namespace of files and directories, for example. As an example, when a new data storage device (not shown) is added to a clustered network system, the file system module 218 is informed where, in an existing directory tree, new files associated with the new data storage device are to be stored. This is often referred to as "mounting" a file system.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the memory 202 also includes an analytics module 220 that includes a database 222 storing delta records 224 and tally records 226. The analytics module 220 continuously maintains information regarding the file system managed by the file system module 218 and hosted by the data storage devices 110(1)-110(n) and/or cloud storage device(s) 111. The information includes recursive properties of the file system that are maintained in a hierarchical tree that includes interior nodes including a root node, which can correspond to directories of the file system, and leaf nodes, which can correspond with files of the file system that are maintained in the directories.

In one particular example, a recursive property can be data size and the parent interior node of a plurality of leaf nodes can maintain the total size of all of the files associated with the child leaf nodes, and so on recursively up the hierarchical tree. In another examples, a recursive property can be a file count and the parent interior node can maintain the total number of all of the files associated with child leaf nodes, a subset of which may be leaf nodes of other interior node(s) that are below the parent interior node in the hierarchical tree. In yet other examples, the recursive property can be file age/creation time or file modification time, and any number or combination of properties can be maintained in, and propagated up, the hierarchical tree in other examples. The analytics module 220 is further configured to utilize the tally records 226 to generate reports, respond to queries, and/or provide statistical information associated with the recursive properties.

The database 222 in this example maintains the hierarchical tree with the interior and leaf nodes, along with delta records 224 and tally records 226 corresponding to one or more of the nodes. The database 222 can be an indexed persistent store or an in-memory structure (e.g., a red/black tree or a hash table), and other types of storage structures can also be used depending on application requirements. In some examples, the tally records 226 are maintained locally for those interior nodes (and directories) that are also maintained locally. In these examples, the database 222 stores a portion of the hierarchical tree that is distributed across a plurality of the node computing devices 106(1)-106(n).

Each of the tally records 226 includes at least a value that comprises a tally or total value (e.g., total data size) stored by each of the nodes below the node corresponding to the tally record in the hierarchical tree, which may be any combination of interior and leaf nodes. Optionally, the tally records 226 can also include a count of the number of child interior and/or leaf nodes and can have an associated unique identifier. Each of the delta records 224 is associated with one of the interior nodes and includes a value that will be used to update the value in one of the tally records 226 that corresponds to the one of the interior nodes. The delta records 224 can also include count(s) that are also used to update the corresponding tally record counts, a timestamp, and/or a unique identifier associated with the corresponding one of the interior nodes, among other information in other examples.

The value in one of the delta records 224 is used to update the value in a corresponding one of the tally records 226 upon expiration of a timer associated with the one of the delta records 224 and optionally set upon creation of the one of the delta records 224. The timers can be a module, script, or other set of executable instructions that are configured to generate an alert to the analytics module 220 with an identifier for an associated one of the delta records 224 when a specified time period has expired. Additionally, the timers can be maintained in a timer data structure 228 in the memory 202, which can be a queue or any other type of structure. Accordingly, the timers each have an associated time period that, upon expiration, triggers an alert that initiates the upward propagation of a value of an associated one of the delta records 224 into a corresponding one of the tally records 226.

Prior to the timer expiration, the value of the associated one of the delta records 224 could have been increased or reduced any number of times, based on storage activity associated with the file system, for example, without triggering a value propagation and incurring the associated performance cost. The operation of the analytics module 220 is described and illustrated in more detail below with reference to FIGS. 3-7.

The examples of the technology described and illustrated herein may be embodied as one or more non-transitory computer or machine readable media, such as the memory 202, having machine or processor-executable instructions stored thereon for one or more aspects of the present technology, which when executed by processor(s), such as processor(s) 200, cause the processor(s) to carry out the steps necessary to implement the methods of this technology, as described and illustrated by way of the examples herein. In some examples, the executable instructions are configured to perform one or more steps of a method, such as one or more of the exemplary methods described and illustrated later with reference to FIGS. 3-5, for example.

Figure 3:
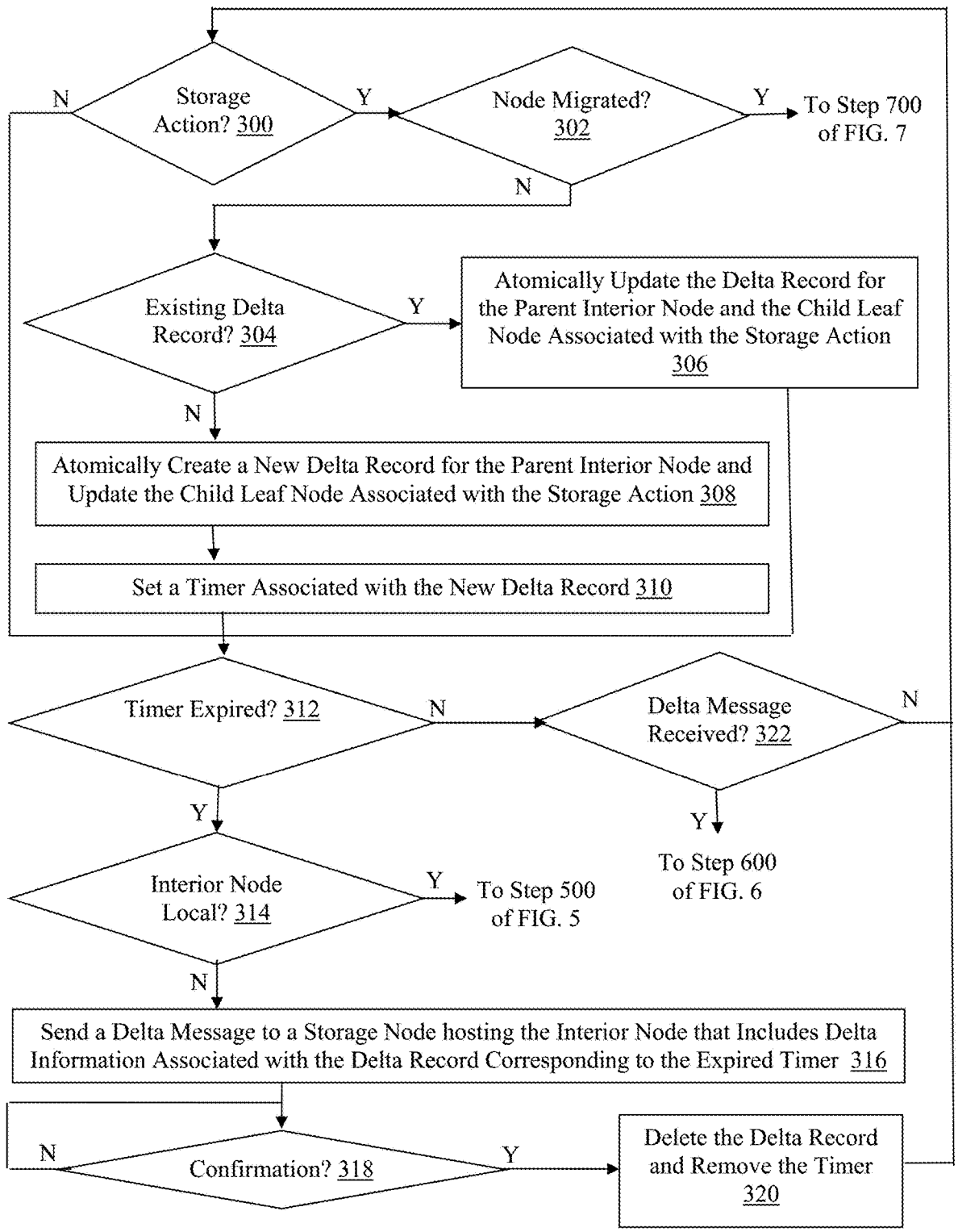
FIG. 3 is a flowchart of an exemplary method for hierarchical propagation in a tree structure.

Referring more specifically to FIG. 3, a flowchart of an exemplary method for hierarchical propagation in a hierarchical tree is illustrated. In step 300 in this example, the node computing device 106(1) determines whether a storage action has occurred that impacts at least one property in at least one of the tally records 226 for at least one node in a hierarchical tree maintained by the analytics module 220. In the particular example described and illustrated herein, the hierarchical tree includes interior nodes that correspond to directories of a file system and leaf nodes that correspond to files maintained in the directories, although other types of hierarchical trees and nodes can be used in other examples and applications of this technology.

Additionally, in this particular example, the nodes maintain a property or value that is the size of the associated file(s). Since each leaf node corresponds with a file, it maintains a value of the file size. Since each interior node corresponds with a directory, it maintains a value corresponding to a tally of total size of all of the files maintained in the directory. Accordingly, the storage action in this example can be a change in the size of a file, although other types of values can be used, and other types of storage actions can occur, in other examples. The analytics module 220 can monitor the file system to identify the storage action, or a notification of the storage action can be triggered to the analytics module 220 from the file system module 218, for example, and other methods of determining that a storage action has occurred can also be used.

Figure 4:
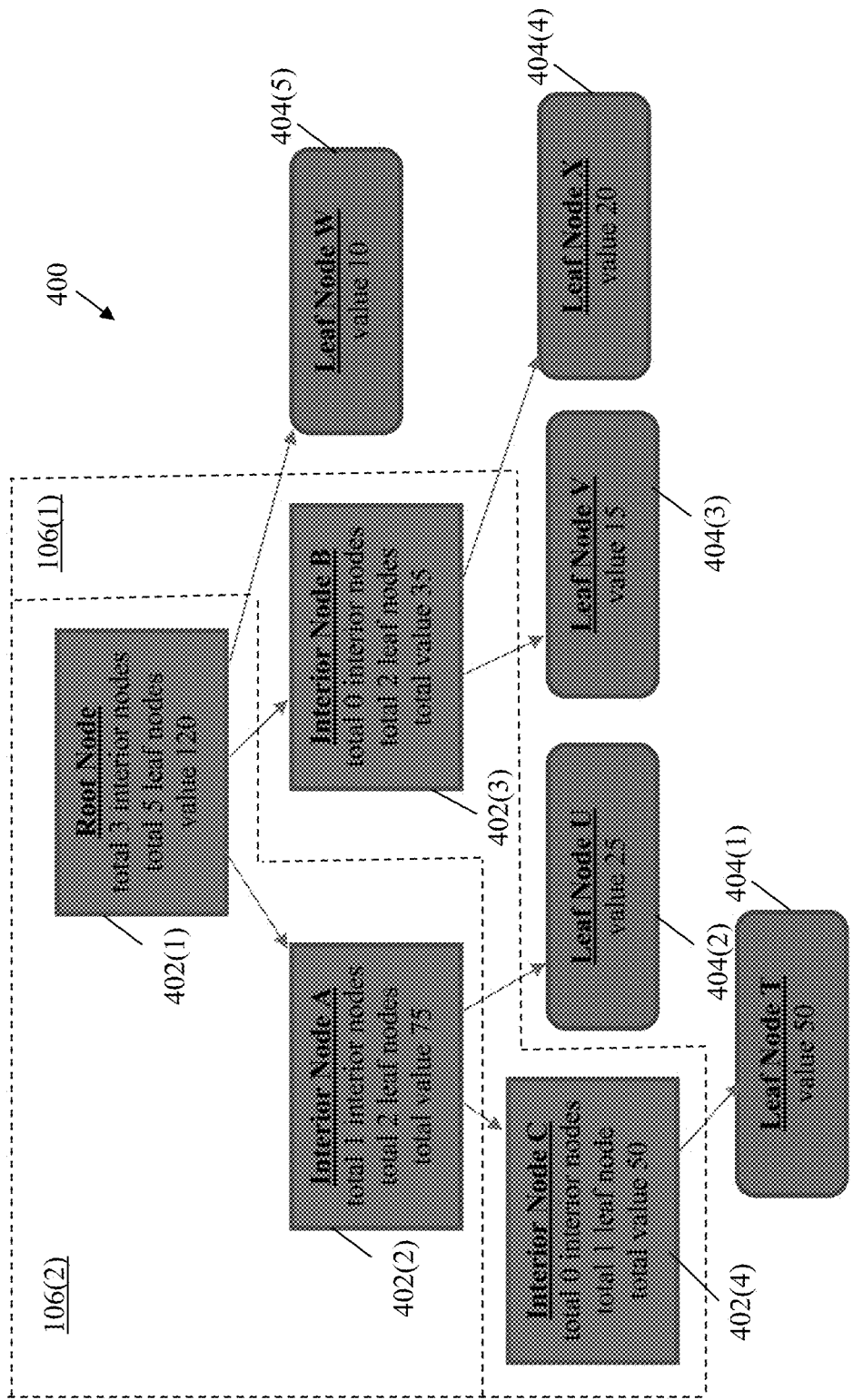
FIG. 4 is an exemplary hierarchical tree with interior and leaf nodes.

Referring to FIG. 4, an exemplary hierarchical tree 400 with interior nodes 402(1)-402(4) and leaf nodes 404(1)-404(5) is illustrated. In this example, the interior node 402(1) is a root node and, along with interior node 402(2), is hosted and maintained locally by node computing device 106(2). Additionally, interior nodes 402(3) and 402(4) are hosted and maintained locally by node computing device 106(1). Accordingly, the database 222 hosted by node computing device 106(1) is a portion of a distributed database that extends across the storage cluster of the network environment 100 that includes at least node computing device 106(1) and 106(2).

Each of the interior nodes 402(1)-402(4) in this example stores a count of the total number of interior child nodes and leaf child nodes that are included in the associated branch, along with a tally corresponding to a total value of each of the child leaf nodes. For example, the interior node 402(2) has a child leaf node 404(2) of value 25 and a child interior node 402(4), which has one child leaf node 404(1) of value 50. Accordingly, interior node 402(2) stores a count of one interior node, two leaf nodes, and a value of 75 (i.e., the total or tally of the values of the leaf nodes 404(1) and 404(2) in the associated branch of the hierarchical tree 400).

Referring back to FIG. 3, if the node computing device 106(1) determines that a storage action has occurred, then the Yes branch is taken to step 302. In step 302, the node computing device 106(1) determines whether the storage action is a migration of an interior or leaf node to another portion of the hierarchical tree. Node migration is one exemplary storage action that is relatively complex as compared to a storage action that changes the value of a leaf node, and can be handled by the disclosed technology as described and illustrated in more detail below with reference to FIG. 7. If the node computing device 106(1) determines that a node migration has not occurred, then the No branch is taken to step 304.

In step 304, the node computing device 106(1) determines whether there is an existing delta record that is associated with an interior node that is a parent of the node associated with the storage action. If an existing delta record is associated with the parent interior node, then the value of that node was previously updated while a timer for the delta record was pending, as described and illustrated in more detail below. The delta records can each include a unique identifier for one of the interior nodes that can be compared with context information for the storage action to determine whether the condition in step 304 is satisfied, for example. Accordingly, if the node computing device 106(1) determines that there is a corresponding existing delta record, then the Yes branch is taken to step 306.

In step 306, the node computing device 106(1) updates the existing delta record for the immediate parent interior node, as well as the child leaf node associated with the storage action, in an atomic transaction. Accordingly, the child leaf node is updated to reflect the value change resulting from the storage action, and the value of the existing delta record for the parent interior node is updated to reflect the value change resulting from the storage action.

Since the delta record for the parent interior node exists, a prior storage action occurred that changed the value of that node, but the updated value has not yet been propagated up the hierarchical tree because the timer associated with the delta record has not yet expired. By updating the value in the delta record, the performance cost of propagating the value change associated with the prior storage action is advantageously not incurred in this example the value for the associated node was subsequently updated in relatively close proximity in time (i.e., prior to expiration of the time period in the timer set for the delta record). Referring back to step 304, if the node computing device 106(1) determines that there is not an existing delta record for the parent interior node, then the No branch is taken to step 308.

In step 308, the node computing device 106(1) creates a new delta record for the immediate parent interior node, and updates the child leaf node associated with the storage action, in an atomic transaction. The new delta record reflects the increased value resulting from the storage action, includes a unique identifier for the parent interior node, and optionally includes a timestamp corresponding to a current time at which the new delta record was created.

Referring back to FIG. 4, in one particular example, the storage action results in leaf node 404(1) growing in value by one. The storage action in this example occurs on node computing device 106(1), although the storage action may occur on any of the node computing devices 106(1)-106(n) in the network environment 100 in other examples.

Accordingly, the node computing device 106(1) checks its local database 222 in step 304 and determines that a delta record does not exist for the immediate parent interior node 402(4). Therefore, the node computing device 106(1) creates a new delta record to be stored in the database 222, which can be represented as follows: Delta Record for Interior Node C: {interior=+0, leaf=+0, value=+1}. Accordingly, the created delta record indicates that the tallied value associated with interior node 402(4) (i.e., identified by unique identifier "C") has increased by one. The delta records can also be represented in other ways in other examples.

Referring back to FIG. 3, subsequent to creating the new delta record in step 308, the node computing device 106(1) proceeds to step 310 in this example. In step 310, the node computing device 106(1) sets a timer associated with the new delta record created in step 308. Optionally, the timer can be inserted into the timer data structure 228 and can be configured to trigger an alert when a time period specified in the timer has elapsed. The alert can include an indication of the new delta record 224 and/or the parent interior node to which it is associated.

The time period specified in the timer set in step 310 can be a configurable, fixed, and/or constant value, for example. Higher values for the time period will result in increased delay in allowing a particular change to a leaf node to propagate fully upward to the root node. The increased delay will be in exchange for significantly reduced overhead because more changes are absorbed during the wait for the time period to expire, and therefore fewer overall steps are necessary to accomplish the full propagation. In other examples, the time period can be determined dynamically, such as based on the optional timestamp added to the new delta record upon creation in step 308. In these examples, the timer can be configured to take into account how long ago the new delta record initial changes were made.

In particular, the timer can be configured to compare the age of the new delta record determined based on the timestamp to a threshold age and, if the age exceeds the threshold, intentionally reduce the specified time period or trigger immediate processing of the new delta record. Other types of time periods or triggers can also be used in other examples. In yet other examples, other rules can be used to specify or modify the time period in a timer, such as establishing higher time periods to reduce contention when the node computing device 106(1) is busy with foreground tasks and using lower time periods to provide faster propagation of changes throughout the hierarchical tree when more resources are otherwise idle, for example.

Dynamic time periods also can facilitate guaranteed propagation timing, even if a hierarchical tree has some branches that are relatively deep. Instead of a particular change to deep-rooted leaf nodes requiring a full propagation delay of N-multiplied-by-depth before it is reflected throughout the hierarchical tree, this technology facilitates adaptation such that after a change has been propagating relatively slowly from level to level, the propagation speed can increase and flow towards the root node relatively quickly. Accordingly, this technology can reduce efficiency in exchange for ensuring that propagation does not take unacceptably long to reach the root node. Subsequent to setting the timer in step 310, updating the delta record and child leaf node in step 306, or if the node computing device 106(1) determines in step 300 that a storage action has not occurred and the No branch is taken, then the node computing device 106(1) proceeds to step 312 in this example.

In step 312, the node computing device 106(1) determines whether one of the timers set and maintained in the timer data structure 228 has expired. The determination can be based on an alert, alarm, or trigger generated by the expiration of the time period specified in the timer, for example. If the node computing device 106(1) determines that a timer has expired, then the Yes branch is taken to step 314.

In step 314, the node computing device 106(1) determines whether the expired timer is associated with an interior node that is hosted locally. The determination can be made based on the unique identifier for the interior node that is specified in the timer set in step 310 and output as part of an alert upon expiration of the timer, for example. If the node computing device 106(1) determines that the interior node corresponding to the expired timer is not stored locally, then the No branch is taken to step 316.

In step 316, the node computing device 106(1) generates and sends a delta message to another of the node computing devices 106(2)-106(n) that is hosting the interior node. Accordingly, the node computing devices 106(1)-106(n) can maintain an indication of which of the node computing devices 106(1)-106(n) are hosting each of the interior nodes. The indication can be maintained as part of the file system in this example in which interior nodes are correlated with directories of a file system that is distributed across the node computing devices 106(1)-106(n) of the network environment 100, although other methods for determining whether an interior node is hosted locally can also be used in other examples.

The delta message in this example includes information associated with the delta record that corresponds with the expired timer and is identified based on the unique identifier for the interior node associated with the expired timer that is output with the alert upon expiration of the timer. Accordingly, the delta message can include the unique identifier for the interior node, the value of the delta record, and the optional timestamp, for example, although other information can also be included in the delta message.

In step 318, the node computing device 106(1) determines whether a confirmation message has been received from the other of the node computing devices 106(2)-106(n) to which the delta message was sent. The confirmation message indicates that the delta message was processed by the other of the node computing devices 106(2)-106(n). The delta message can be processed as described and illustrated in more detail below with reference to FIG. 6. If the node computing device 106(1) determinates that a confirmation message has not been received, then the No branch is taken and the node computing devices 106(1) proceeds back to step 318 and effectively waits for the confirmation message. However, if the node computing device 106(1) determines that the confirmation message is received, then the Yes bran is taken to step 320.

In step 320, the node computing device 106(1) deletes the delta record associated with the timer determined to have expired in step 312, and removes that timer (e.g., from the timer data structure 228). Subsequent to deleting the delta record and removing the timer, the node computing device 106(1) proceeds back to step 300. Accordingly, the node computing device 106(1) effectively waits for a storage action or timer expiration in this example, although steps 300 and 312 can also occur in parallel in other examples. Referring back to step 314, if the node computing device 106(1) determines that the interior node associated with the expired timer is hosted locally, then the Yes branch is taken to step 500 of FIG. 5.

Figure 5:
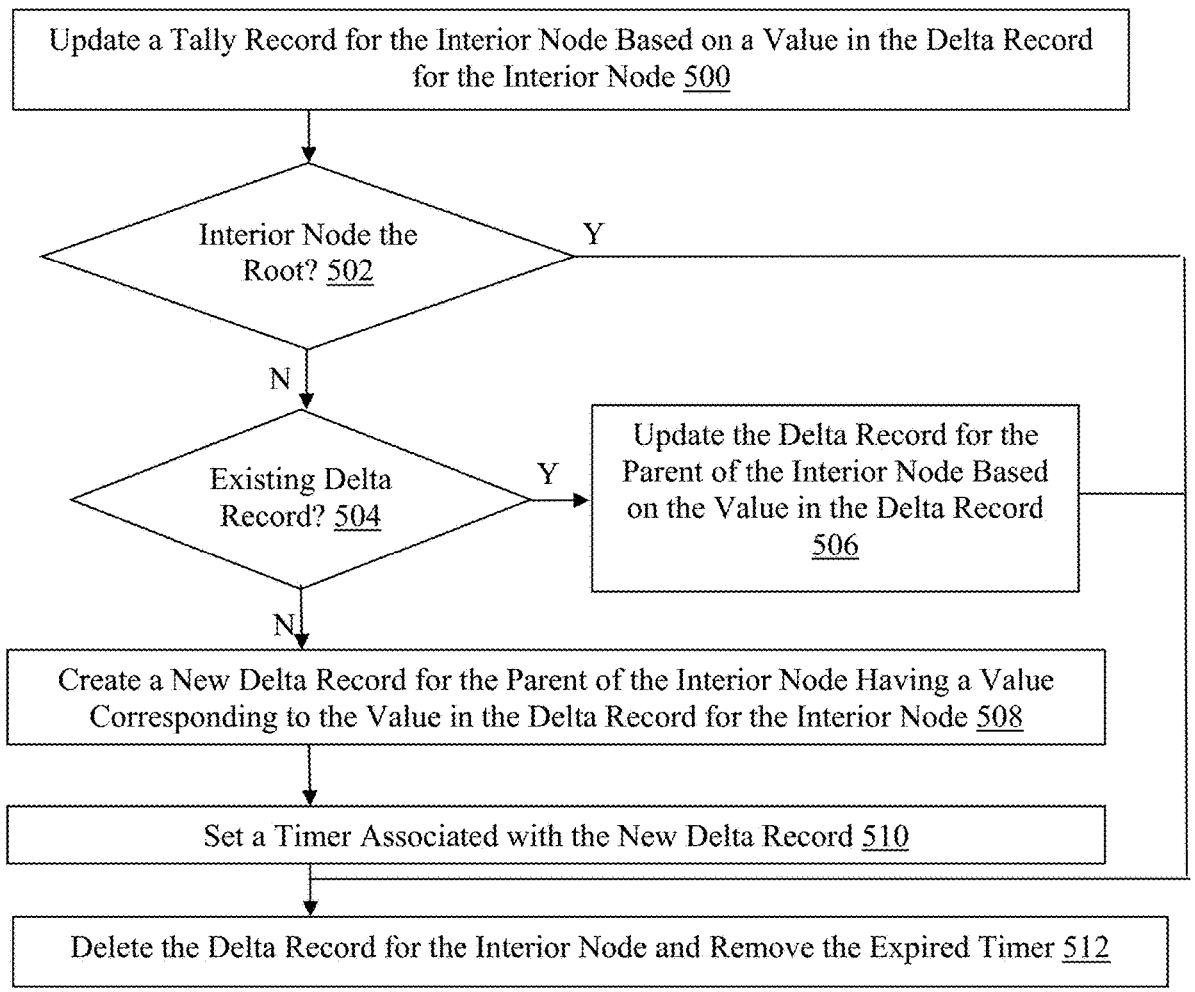
FIG. 5 is a flowchart of an exemplary method for propagating properties for a locally-hosted interior node of a distributed hierarchical tree.

In FIG. 5, a flowchart of an exemplary method for propagating properties for a locally-hosted interior node of a distributed hierarchical tree is illustrated. In step 500 in this example, the node computing device 106(1) updates a tally record for the interior node based on a value in the delta record for the interior node. In the example described and illustrated earlier with reference to FIG. 4, when the timer set in step 310 for the delta record created in step 308, the node computing device 106(1) will determine that the interior node 404(4) associated with the delta record is hosted locally.

Accordingly, the tally record stored in the database 222 for the interior node 402(4) will be updated to reflect the value included in the delta record (i.e., 1) as follows: Tally Record for Interior Node C: {interior=0, leaf=1, value=51}. In this example, the tally record includes the unique identifier for the interior node 402(4) (i.e., C), counts of the interior and leaf node children (i.e., 0 and 1, respectively) for the interior node 402(4), and the value updated from 50 to 51 to reflect the value of one included in the new delta record created in step 308. Other types of information reflecting other properties can also be included in other examples.

Referring back to FIG. 5, in step 502, the node computing device 106(1) determines whether the interior node associated with the delta record corresponding to the expired timer is the root node for the hierarchical tree. If the node computing device 106(1) determines that the interior node is not the root node, then the No branch is taken to step 504.

In step 504, the node computing device 106(1) determines whether there is an existing delta record for another interior node that is the immediate parent of the interior node for which the tally record was updated in step 500. If the node computing device 106(1) determines that there is a delta record for the parent interior node stored locally in the database 222, then the Yes branch is taken to step 506.

In step 506, the node computing device 106(1) updates the existing delta record for the parent interior node based on the value in the delta record for the child interior node for which the associated timer expired. If a delta record for the parent interior node already exists, then the value was updated previously, but has not yet propagated upward in the hierarchical tree following expiration of an associated timer. Accordingly, the performance cost of propagating the prior updated value will not be incurred. However, if the node computing device 106(1) determines in step 504 that there is not an existing delta record for the parent interior node stored locally, then the No branch is taken to step 508.

In step 508, the node computing device 106(1) creates and stores a new delta record for the parent interior node having a value corresponding to the value in the delta record for the child interior node that was associated with the expired timer. The new delta record can be created and stored as described and illustrated in more detail above with reference to step 308. In the example described and illustrated above with reference to FIG. 4, the parent interior node is interior node 402(2). Accordingly, a new delta record is created and stored as follows: Delta Record for Interior Node A: {interior=+0, leaf=+0, value=+1}.

In step 510, the node computing device 106(1) sets a timer associated with the new delta record created and stored in step 510 and associated with the parent interior node. The timer can be set as described and illustrated in more detail above with reference to step 310 of FIG. 3, for example. Subsequent to setting the timer, or updating the existing delta record for the parent interior node in step 506, the node computing device 106(1) proceeds to step 512 in this example.

In step 512, the node computing device 106(1) deletes the delta record associated with the expired timer and the interior node from the database 222 and removes the expired timer. Accordingly, by updating the delta record in step 506, or creating the new delta record in step 508, for the parent interior node, the node computing device 106(1) effectively propagates the value from the delta record associated with the expired timer up the hierarchical tree upon expiration of the timer set in step 510.

Referring back to FIG. 3, if the node computing device 106(1) determines in step 322 that a delta message was not received from another of the node computing devices 106(2)-106(n), then the No branch is taken back to step 300. However, if the node computing device 106(1) determines that a delta message was received in step 322, then the Yes branch is taken to step 600 of FIG. 6. The delta message could have been sent by another of the node computing devices 106(2)-106(n) as described and illustrated in more detail above with reference to step 316 of FIG. 3, for example.

Figure 6:
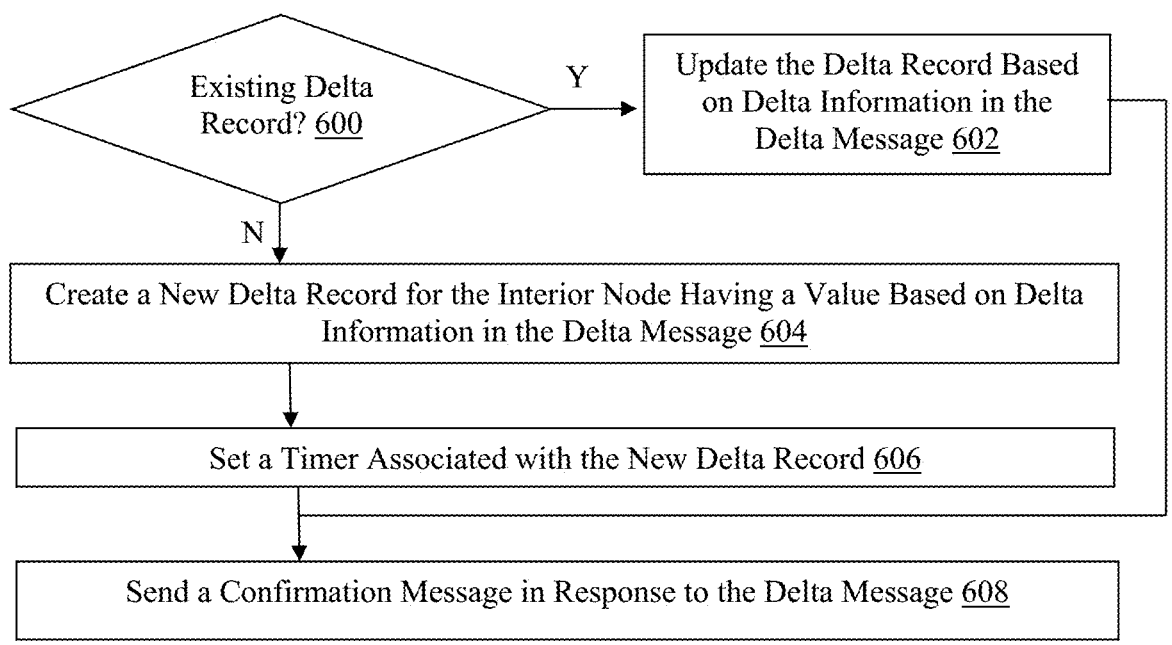
FIG. 6 is a flowchart of an exemplary method for propagating properties for a an externally-hosted interior node of a distributed hierarchical tree.

In FIG. 6, a flowchart of an exemplary method for propagating properties for an externally-hosted interior node of a distributed hierarchical tree is illustrated. In step 600 in this example, the node computing device 106(1) determines whether there is an existing delta record in the database 222 for the interior node corresponding to the received delta message. The interior node can be identified based on delta information in the delta message, including a unique identifier for the interior node, for example. If the node computing device 106(1) determines that there is an existing delta record for the interior node, then the Yes branch is taken to step 602.

In step 602, the node computing device 106(1) updates the existing delta record based on delta information extracted from the delta message, including at least a value identified in the delta message. In some examples, the delta message includes a timestamp of the delta record associated with the expired timer. In these examples, the node computing device 106(1) can retain whichever timestamp is earlier in order to facilitate a dynamic adjustment of the trigger for the timer associated with the delta record based on an age of the delta record, as described and illustrated in more detail above. However, if the node computing device 106(1) determines in step 600 that a delta record for the interior node does not exist, then the No branch is taken to step 604.

In step 604, the node computing device 106(1) creates and stores in the database 222 a new delta record for the interior node, which has a value based on delta information extracted from the received delta message. The new delta record can be created and stored as described and illustrated in more detail above with reference to step 308 of FIG. 3, for example.

In step 606, the node computing device 106(1) sets a timer associated with the new delta record created and stored in step 604, such as described and illustrated in more detail above with reference to step 310 of FIG. 3, for example. Subsequent to setting the timer or updating the existing delta record in step 604, the node computing device 106(1) proceeds to step 608 in this example.

In step 608, the node computing device 106(1) sends a confirmation message to another of the node computing devices 106(2)-106(n) in response to the delta message. The confirmation message can be received as described and illustrated in more detail above with reference to step 318 of FIG. 3, for example. With reference to FIG. 3, if the node computing device 106(1) determines in step 302 that the storage action is a node migration, then the Yes branch is taken to step 700 of FIG. 7.

As described above, a node migration is one exemplary complex storage action that can be handled by the technology described and illustrated herein. A node migration can correspond with a storage action involving movement of a directory from within a first directory to within a second directory of a file system, for example, although other types of node migrations can also occur, and other types of storage and other actions are contemplated by this technology.

Figure 7:
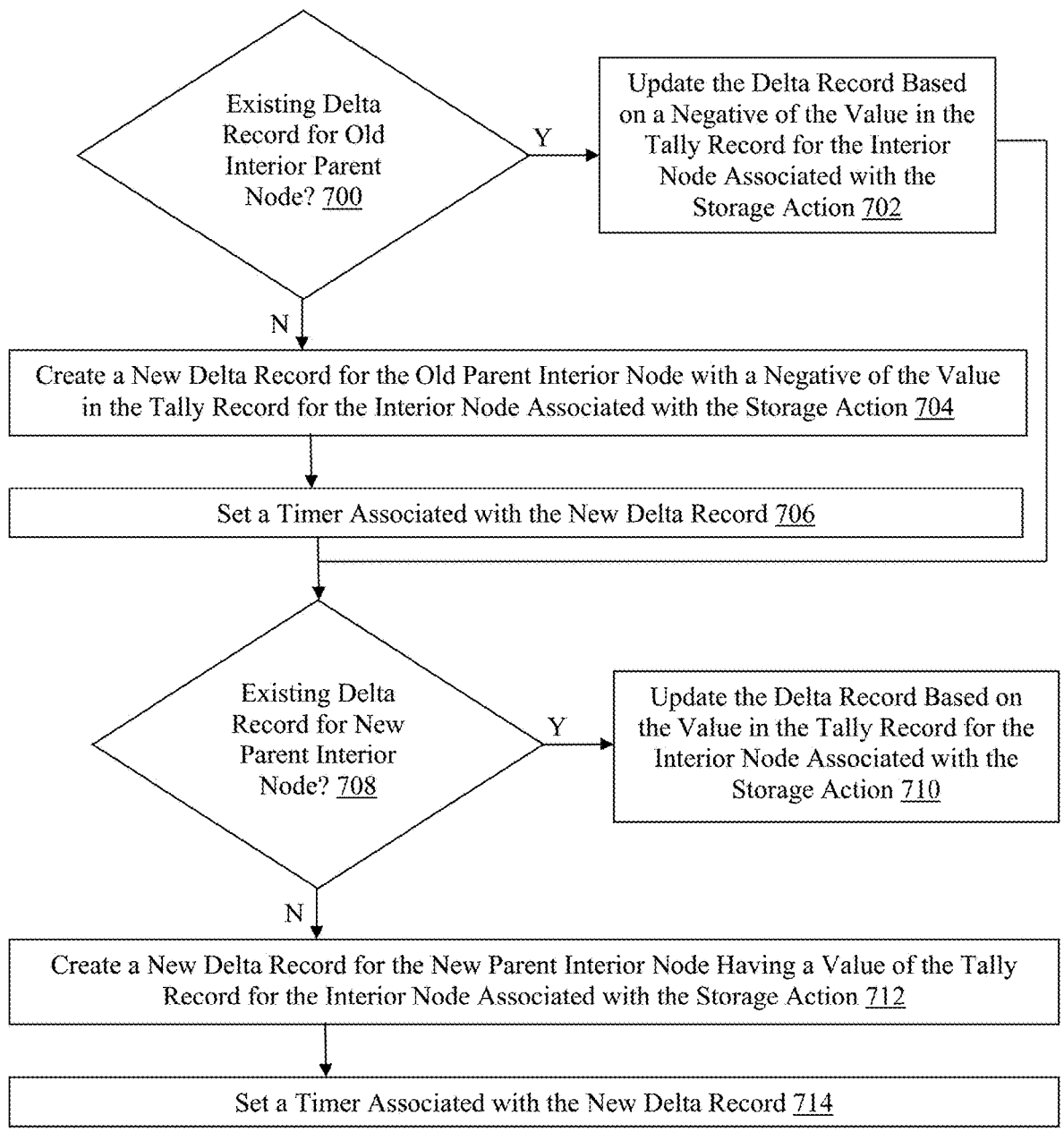
FIG. 7 is a flowchart of an exemplary method for hierarchical propagation in a tree structure following node migration.

Referring to FIG. 7, a flowchart of an exemplary method for hierarchical propagation in a hierarchical tree following node migration is illustrated. In step 700 in this example, the node computing device 106(1) determines whether a delta record exists for an interior node that is the old parent of the interior node associated with the storage action (e.g., an interior node corresponding to the migrated directory in the file system). If the node computing device 106(1) determines that a delta record exists for the old parent interior node, then the Yes branch is taken to step 702.

In step 702, the node computing device 106(1) updates the existing delta record based on a negative of the value in the tally record for the interior node associated with the storage action. The node computing device 106(1) can retrieve the tally record for the interior node from the database 222 based on a unique identifier for the interior node, for example. The value of the tally record indicates the tally or collective value of all of the nodes below interior node in the hierarchical tree and in a same branch as the interior node. Accordingly, the reduction in value resulting from the delta record update in step 702 will result in propagating the result of the migration of that interior node upon expiration of the timer corresponding to that existing delta record. However, if the node computing device 106(1) determines in step 700 that a delta record does not exist for the old parent of the interior node associated with the storage action, then the No branch is taken to step 704.

In step 704, the node computing device 106(1) creates and stores in the database 222 a new delta record for the old parent interior node, which has a negative of the value in the tally record for the interior node associated with the storage action. The new delta record can be created and stored as described and illustrated in more detail above with reference to step 308 of FIG. 3, for example.

In step 706, the node computing device 106(1) sets a timer associated with the new delta record, as described and illustrated in more detail above with reference to step 310 of FIG. 3, for example. Subsequent to setting the timer, or updating the existing delta record in step 702, the node computing device 106(1) proceeds to step 708 in this example.

In step 708, the node computing device 106(1) determines whether a delta record exists in the database 222 for an interior node that is to be the new parent based on the node migration. The new parent interior node corresponds to the directory into which the directory associated with the interior node associated with the storage action is moved in this example. If the node computing device 106(1) determines that the delta record exists for the new parent interior node, then the Yes branch is taken to step 710.

In step 710, the node computing device 106(1) updates the existing delta record based on the value in the tally record for the interior node associated with the storage action. Accordingly, the existing delta record can be updated in step 710 as described and illustrated above with reference to step 702 except that the value of the tally record is added to the value in the existing delta record instead of deducted from the value in the existing delta record. However, if the node computing device 106(1) determines that a delta record does not exist for the new parent interior node, then the No branch is taken from step 708 to step 712.

In step 712, the node computing device 106(1) creates and stores in the database 222 a new delta record for the new parent interior node, which has a value of the tally record for the interior node associated with the storage action. The new delta record can be created and stored as described and illustrated in more detail above with reference to step 308 of FIG. 3, and with respect to the old parent interior node and with reference to step 704.

In step 714, the node computing device 106(1) sets a timer associated with the new delta record, as described and illustrated in more detail above with reference to step 706 and step 310 of FIG. 3. While the steps of the examples of this technology have been described and illustrated herein as occurring in a sequential order, in other examples, one or more of the steps illustrated in FIGS. 3 and/or 5-7 can occur in parallel and/or in a different order.

With this technology, propagation of recursive properties in hierarchical trees can be performed more efficiently, with reduced resource consumption, at the cost of latency in the propagation. Accordingly, the technology can advantageously be tuned to favor faster propagation or lower resource consumption based on fixed time periods specified in set timers, or based on time periods specified in the timers dynamically based on device activity, for example. Thereby, the analytics software that relies on the hierarchical tree effectively reduces its impact on foreground workload while still producing relatively accurate results relatively quickly upon request.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:

creating, by a computing device, a first delta record for a first interior node and updating a first tally record for a leaf node based on a first value in response to an action associated with the leaf node, wherein the first interior node is a parent of the leaf node in a hierarchical tree and the first delta record comprises a unique identifier for the first interior node and the first value;

setting, by the computing device, a first timer associated with the first delta record based on the unique identifier;

updating, by the computing device, a second value in a second tally record for the first interior node based on the first value in order to propagate the first value up the hierarchical tree, when the first timer has expired and the interior node is hosted locally, wherein the second tally record is identified based on the unique identifier; and creating, by the computing device, a second delta record for a second interior node after updating the second value, when the first interior node is below a root node in the hierarchical tree, wherein the second interior node is a parent of the first interior node and the second delta record comprises the first value.

2. The method of claim 1, further comprising deleting, by the computing device, the first delta record and removing the first timer after setting a second timer in the in-memory data structure, wherein the second timer is associated with the second delta record based on another unique identifier for the second delta record.

3. The method of claim 1, further comprising inserting, by the computing device, the first timer into an in-memory data structure after setting the first timer, wherein the first timer comprises a expiration time period and is determined to have expired when the expiration time period has lapsed.

4. The method of claim 1, wherein the hierarchical tree corresponds to a structure of a file system, the first interior node corresponds to a directory in the file system, and the leaf node corresponds to a file maintained in the directory.

5. A non-transitory machine readable medium having stored thereon instructions for hierarchical propagation in a tree structure comprising machine executable code that, when executed by at least one machine, causes the machine to:
- update a first tally record for a leaf node, and a first delta record for a first interior node, based on a first value and in response to an action associated with the leaf node, wherein the first interior node is a parent of the leaf node and the first delta record comprises a first unique identifier for the first interior node;
- set a first timer in an in-memory data structure, wherein the first timer is associated with the first delta record based on the first unique identifier;
- update the first delta record in response to another action associated with the leaf node or another child of the first interior node and prior to expiration of the first timer; and
- send a first delta message to a computing device, when the first timer has expired and the first interior node is hosted externally by the computing device, wherein the first delta message comprises the first unique identifier and the first value.

6. The non-transitory machine readable medium of claim 5, wherein the machine executable code, when executed by the machine, further causes the machine to insert a timestamp into the first timer upon setting the first timer.

7. The non-transitory machine readable medium of claim 6, wherein the machine executable code, when executed by the machine, further causes the machine to determine the first timer has expired when a difference between a current time and the timestamp exceeds a threshold.

8. The non-transitory machine readable medium of claim 5, wherein the machine executable code, when executed by the machine, further causes the machine to delete the first delta record and remove the first timer after receipt of a confirmation message from the computing device indicating successful incorporation of the first value into a second delta record for the first interior node at the computing device.

9. The non-transitory machine readable medium of claim 5, wherein the machine executable code, when executed by the machine, further causes the machine to create a second delta record that comprises a second value in a second delta message received from the computing device, wherein the second delta record is for a second interior node that is stored locally.

10. The non-transitory machine readable medium of claim 9, wherein the machine executable code, when executed by the machine, further causes the machine to set a second timer in the in-memory data structure, wherein the second timer is associated with the second delta record based on a second unique identifier corresponding to the second interior node and included in the second delta message.

11. The non-transitory machine readable medium of claim 9, wherein the machine executable code, when executed by the machine, further causes the machine to send a confirmation message to the computing device after creation of the second delta record and in response to the received second delta message.

12. The non-transitory machine readable medium of claim 5, wherein the machine executable code, when executed by the machine, further causes the machine to update a second delta record for a second interior node based on a second value in a received second delta message, wherein the second interior node is stored locally.

13. A computing device, comprising:
- a memory containing machine readable medium comprising machine executable code having stored thereon instructions for hierarchical propagation in a tree structure; and
- a processor coupled to the memory, the processor configured to execute the machine executable code to cause the processor to:
  - create a first delta record for a first interior node in response to activity associated with a leaf node that is a child of the first interior node, wherein the first interior node corresponds to a directory of a file system and the first delta record comprises a first value;
  - update a first tally record for the leaf node based on the first value, wherein the leaf node corresponds to a file maintained in the directory and the first delta record and first tally record are maintained in a database;
  - insert a first timer into an in-memory data structure, wherein the first timer is associated with the first delta record;
  - create a second delta record for a second interior node in response to a storage operation, wherein the second interior node is an old parent of a third interior node moved as part of the storage operation and the second delta record comprises a negative value corresponding to a positive value in a third tally record corresponding to the third interior node; and
  - update a second tally record for the first interior node based on the first value, when the first timer has expired.

14. The computing device of claim 13, wherein the processor is further configured to execute the machine executable code to further cause the processor to insert a unique identifier for the first interior node into the first delta record, wherein the first timer is associated with the unique identifier and the second tally record is identified based on the unique identifier.

15. The computing device of claim 13, wherein the database comprises another in-memory data structure.

16. The computing device of claim 13, wherein the database comprises an indexed persistent data store that is distributed across a plurality of computing devices on which the file system is maintained.

17. The computing device of claim 13, wherein the processor is further configured to execute the machine executable code to further cause the processor to create a third delta record for a fourth interior node based on the positive value and in response to the storage operation, wherein the fourth interior node is a new parent of the third interior node.

* * * * *